(12) United States Patent
Kitahara et al.

(10) Patent No.: US 8,863,930 B2
(45) Date of Patent: Oct. 21, 2014

(54) ROTATING RANGE RESTRICTION MECHANISM FOR ROTATING BODY, AND INDUSTRIAL ROBOT

(75) Inventors: Yasuyuki Kitahara, Nagano (JP); Shigeyuki Kaino, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/814,975

(22) PCT Filed: Apr. 17, 2012

(86) PCT No.: PCT/JP2012/060307
§ 371 (c)(1),
(2), (4) Date: Feb. 21, 2013

(87) PCT Pub. No.: WO2012/147558
PCT Pub. Date: Nov. 1, 2012

(65) Prior Publication Data
US 2014/0033853 A1 Feb. 6, 2014

(30) Foreign Application Priority Data

Apr. 27, 2011 (JP) ................................ 2011-098937

(51) Int. Cl.
*G05G 1/04* (2006.01)
*B25J 9/04* (2006.01)
*B25J 9/10* (2006.01)
*B25J 19/00* (2006.01)
*G05G 5/04* (2006.01)

(52) U.S. Cl.
CPC *B25J 19/00* (2013.01); *B25J 9/042* (2013.01); *B25J 9/101* (2013.01); *G05G 5/04* (2013.01)
USPC ........................................... 192/138; 74/526

(58) Field of Classification Search
CPC .............. B25J 9/00; B25J 9/042; B25J 9/102; B25J 9/108; H01L 21/67706; H01L 21/67742; H01L 21/67766
USPC ............. 74/10.2, 411.5, 490.04, 490.05, 526; 414/744.1, 744.5, 744.6, 939, 941; 901/15, 17, 20, 21, 25, 28; 192/139, 192/143
See application file for complete search history.

(56) References Cited

U.S. PATENT DOCUMENTS 3,012,447 A * 12/1961 Wallace ........................... 74/526

FOREIGN PATENT DOCUMENTS

| JP | 2-232191 | | 9/1990 |
| JP | 03-014955 | * | 1/1991 |

(Continued)

*Primary Examiner* — Saul Rodriguez
*Assistant Examiner* — Ronald Jarrett
(74) *Attorney, Agent, or Firm* — Frommer Lawrence & Huag LLP

(57) ABSTRACT

A rotating range restricting mechanism that restricts the rotating range of a rotating body rotatable 360 degrees or more with respect to a supporting body includes: a swing member rotatably attached to the supporting body; a first restricting member abutting the swing member to restrict the swing range of one end of the swing member; a second restricting member abutting the swing member to restrict the swing range of the other end of the swing member; an engaging member fixed to the rotating body which engages with the swing member to allow the swing member to swing between a first restricting position and a second restricting position; a first magnetic holding mechanism that holds the swing member in the first restricting position with a magnetic attraction force; and a second magnetic holding mechanism that holds the swing member in the second restricting position with a magnetic attraction force.

4 Claims, 6 Drawing Sheets

(56) References Cited

FOREIGN PATENT DOCUMENTS

| | | |
|---|---|---|
| JP | 3-66585 | 3/1991 |
| JP | 5-177578 | 7/1993 |
| JP | 6-3581 | 1/1994 |
| JP | 2003-170384 | 6/2003 |
| JP | 2003-205488 | 7/2003 |
| JP | 2003-260684 | 9/2003 |
| JP | 3648875 | 5/2005 |

* cited by examiner

ROTATING RANGE RESTRICTION MECHANISM FOR ROTATING BODY, AND INDUSTRIAL ROBOT

The present application claims priority from PCT Patent Application No. PCT/JP2012/060307 filed on Apr. 17, 2012, which claims priority from Japanese Patent Application No. JP 2011-098937, filed on Apr. 27, 2011, the disclosures of which are incorporated herein by reference in their entirety.

FIELD OF THE INVENTION

The present invention relates to a rotating range restricting mechanism for a rotating body for restricting the rotating range of a rotating body rotatable 360 degrees or more with respect to a supporting body. Also, the present invention relates to an industrial robot having the rotating range restricting mechanism for a rotating body.

It is noted that citation or identification of any document in this application is not an admission that such document is available as prior art to the present invention.

Conventionally, known as an industrial robot for transporting works such as semiconductor wafers is an industrial robot having a base section affixed to a floor surface, a main section rotatably joined to the base section, a first arm affixed to the main body section with its base end, a second arm rotatably joined to the front end of the first arm with its base end, and a hand rotatably joined to the front end of the second arm with its base end (see Publication of Unexamined Japanese Patent Application 2003-170384 ("JP 2003-170384"), for example). In the industrial robot disclosed in JP 2003-170384, the base section is provided with a lifting platform that is raised and lowered, and the body section has a body frame to which the base section of the first arm is affixed.

In this industrial robot, the body frame is rotatable 360 degrees or more with respect to the lifting platform, and a stopper section is provided between the lifting platform and the body frame to restrict the rotating range of the body frame. The stopper section is provided with an L-shaped stopper member turnably attached to the lifting platform, a stop pin affixed to the main body frame, two stoppers for restricting the turning range of the stop member and a stop roller for maintaining the state in which the stop member is abutting on the stopper. Two grooves in the axial direction with which the stop roller engages are formed on a turning shaft that supports the stop member, and the stop roller is urged toward the turning shall by a spring. In the stopper section, when the stop roller engages in one of the axial grooves, the state in which the stop member is abutting on one of the stoppers is maintained; when the stop roller engages with the other one of the axial grooves, the state in which the stop member is abutting on the other stopper is maintained.

In the industrial robot disclosed in JP 2003-170384, when the body frame rotates such that the stop pin abuts on the stop member from the inside of the L-shaped stop member, the stop pin knocks down the stop member to allow the body frame to rotate. On the other hand, when the body frame rotates such that the stop pin abuts on the stop member from the outside the L-shaped stop member, the stop pin abuts on the stop member which is abutting on the stopper to stop the body frame from rotating.

It is noted that in this disclosure, and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of any previously described product, method of making the product, or process of using the product.

SUMMARY OF THE INVENTION

In the industrial robot disclosed in JP 2003-170384, the stop roller for maintaining the status in which the stop member is abutting on the stopper is urged toward the turning shaft that supports the stop member; the stop roller is constantly in contact with the turning shaft. Therefore, in this industrial robot, dust may be generated from the contact portion between the stop roller and the turning shaft accompanying the turn of the turning shaft. Also, in this industrial robot, noise may be generated from the contact portion between the stop roller and the turning shaft accompanying the turn of the turning shaft.

Therefore, an objective of the present invention is to provide a rotating range restricting mechanism for a rotating body that restricts the rotating range of a rotating body rotatable 360 degrees or more with respect to a supporting body, in which dust or noise is suppressed from being generated. Also, another objective of the present invention is to provide an industrial robot having such a rotating range restricting mechanism for a rotating body. Also, another objective of the present invention is to provide an industrial robot having the rotating range restricting mechanism for a rotating body.

To achieve the above objectives, the rotating range restricting mechanism for a rotating body of the present invention for restricting the rotating range of a rotating body which is rotatable 360 degrees or more with respect to the supporting body, is provided with a swing member swingably attached to the supporting body, a first restricting member which is affixed or formed to the supporting body and abuts on the swing member to restrict the rotating range of one end of the swing member, a second restricting member which is affixed or formed to the supporting body and abuts on the swing member to restrict the rotating range of the other end of the swing member, an engaging member which is affixed or formed to the rotating body and engages with the swing member to allow the swing member to swing between a first restricting position, at which the swing member abuts on the first restricting member, and a second restricting position, at which the swing member abuts on the second restricting member, a first magnetic holding mechanism which holds the swing member in the first restricting position with a magnetic attraction force or magnetic repelling force, and a second magnetic holding mechanism which holds the swing member in the second restricting position with a magnetic attraction, force or magnetic repelling force.

In the rotating range restricting mechanism for a rotating body of the present invention, the swing member is held in the first position, at which the swing member abuts on the first restricting member, with the magnetic attraction force or magnetic repelling force of the first magnetic holding mechanism and also is held in the second restricting position, at which the swing member abuts on the second restricting member, with the magnetic attraction force or magnetic repelling force of the second magnetic holding mechanism. Therefore, even when the swing member needs to be held in the first restricting position or in the second restricting position to properly rotate the rotating body by 360 degrees or more with respect to the supporting body, there is no need to have the member for holding the swing member in the first restricting position or in the second restricting position make contact with the swing member. Therefore, in this present invention, dust or noise can be suppressed from being generated accompanying the swing of the swing member between the first restricting position and the second restricting position.

In the present invention, the first magnetic holding mechanism and the second magnetic holding mechanism are respectively provided with a permanent magnet, which is affixed to either the swing member or the supporting body, and a magnetic member or a permanent magnet, which is affixed to other part, either the swing member or the supporting body.

In the present invention, it is preferred that the center of the swing of the swing member when viewed in the axial direction of the rotating axis of the rotating body be positioned outside the imaginary circle which is a trace of an engaging member rotating together with the rotating body. With this configuration, when viewed in the axial direction of the rotating axis of the rotating body, the swing member can properly be swung by the engaging member even if the distance from the center of the rotation of the rotating body to the engaging member is shortened, compared to the case in which the center of the swing of the swing member is arranged inside the imaginary circle. Therefore, the rotation radius of the engaging member can be minimized, and consequently the size of the rotating range restricting mechanism can be minimized.

In the present invention, it is preferred that an engaging groove with which the engaging member engages when swing member swings between the first restricting position and the second restricting position be formed in the swing member, the engaging member be formed in a cylindrical shape, and a semi-arc shaped concave surface having the inside diameter equal to the outside diameter of the engaging member be formed along the side face of the engaging groove. If the rotating body stops rotating when the swing member is anywhere between the first restricting position and the second restricting position, the force of the first magnetic holding mechanism to hold the swing member and the force of the second magnetic holding mechanism to hold the swing member do not work; therefore, even though the rotating body has stopped, the swing member may become wobbly. However, this configuration makes it possible that the outer circumferential surface of the engaging member makes contact with a relatively wide range of the semi-arc concave surface when the swing member is somewhere between the first restricting position and the second restricting position; therefore, even if the rotating body stops rotating when the swing member is somewhere between the first restricting position and the second restricting position, the engaging member can prevent the swing member from being wobbly.

The rotating range restricting mechanism for a rotating body of the present invention can be adopted to an industrial robot, which is provided with a main body section, a first arm turnably joined to the main body section with its base end, a second arm rotatably joined to the front end of the first arm with its base end, a third arm rotatably joined to the front end of the second arm with its base end, and hands rotatably joined to the front end of the third arm with their base ends; wherein the rotating body is the third arm, and the supporting body is the second arm. In this industrial robot, dust or noise can be suppressed from being generated accompanying the swing of the swing member.

As described above, in the rotating range restricting mechanism for a rotating body and the industrial robot of the present invention, dust and noise can be suppressed from being generated accompanying the swing of the swing member.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements winch are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
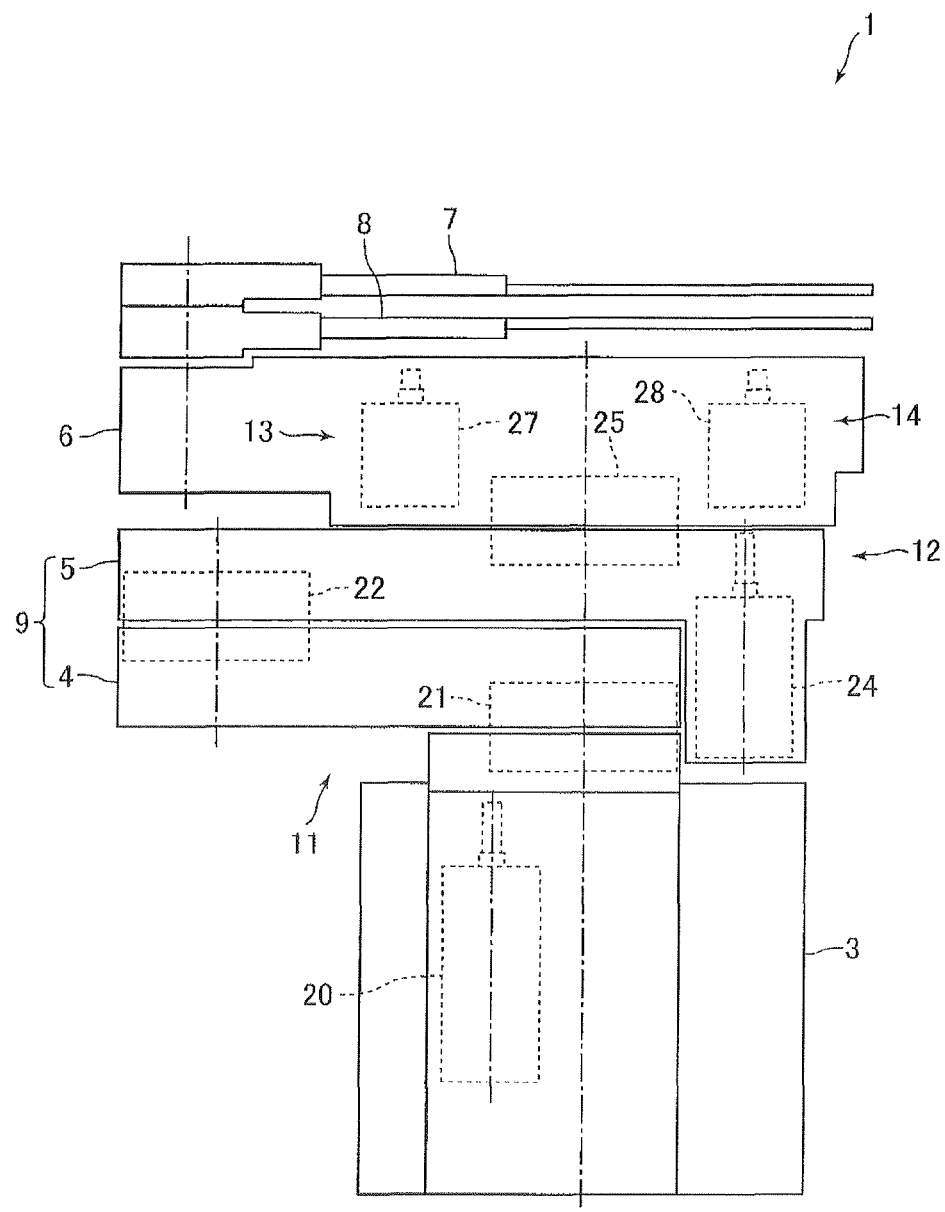
FIG. 1 shows a side view of an industrial robot of an embodiment of the present invention.
Figure 2:
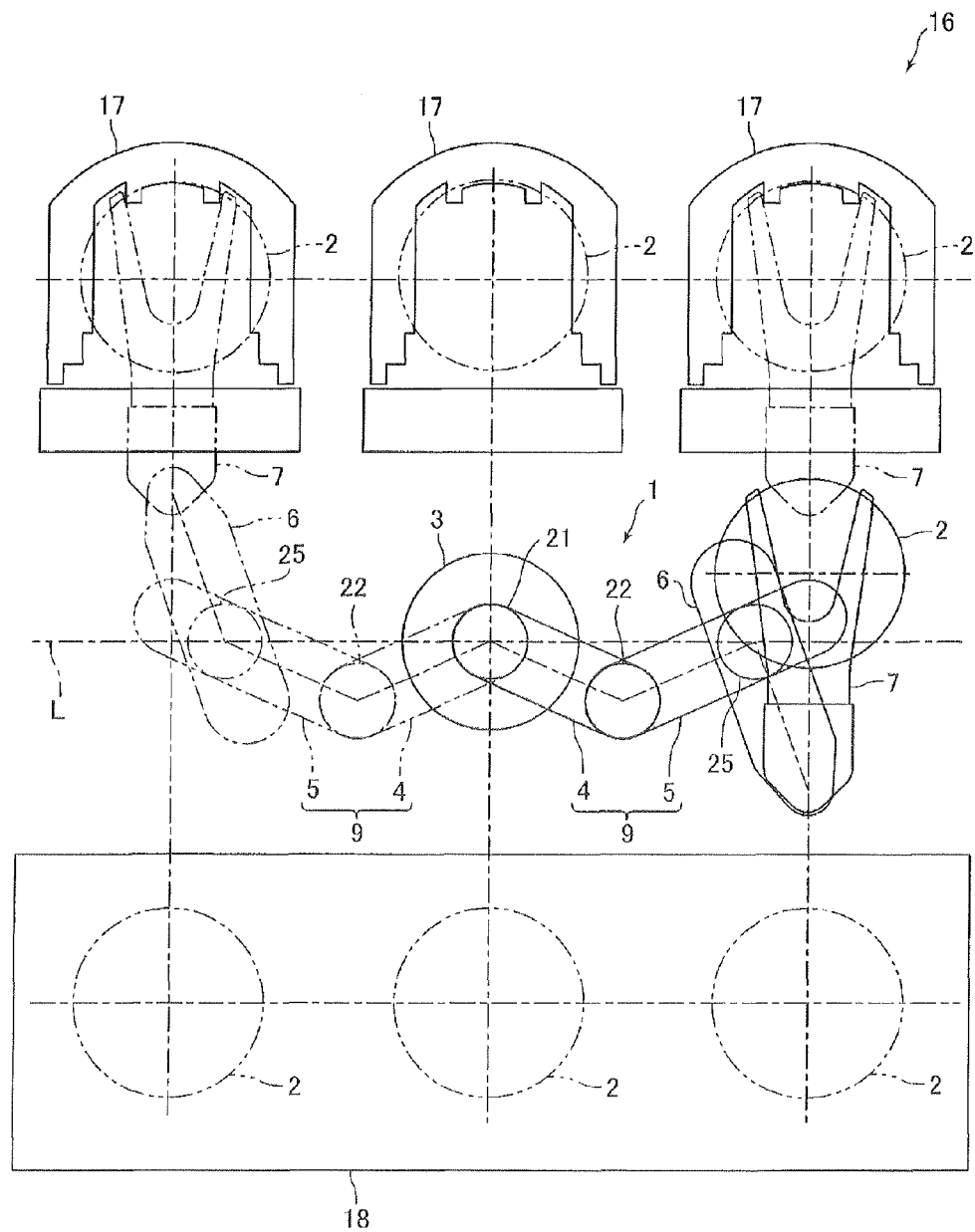
FIG. 2 shows a plan view of a semi-conductor manufacturing system in which the industrial robot shown in FIG. 1 is adopted.

Configuration of Industrial Robot:

FIG. 1 is a side view of an industrial robot 1 of an embodiment of the present invention. FIG. 2 is a plan view of a semiconductor manufacturing system in which the industrial robot 1 shown in FIG. 1 is adopted.

The industrial robot 1 of this embodiment is an articulated robot used for transporting semiconductor wafers 2 (see FIG. 2). The industrial robot 1 is, as shown in FIG. 1, configured by a main body section 3, a first arm 4 turnably joined to the main body section 3, a second arm 5 turnably joined to the first arm 4, a third arm 6 rotatably joined to the second arm 5 and hands 7 and 8 rotatable joined to the third arm 6. Note that the industrial robot 1 is denoted as a "robot 1" and the semiconductor wafer 2 as "wafer 2" in the description below.

The robot 1 is also provided with an arm section driving mechanism 11, which stretches an arm section 9 consisting of the first arm 4 and the second arm 5 by turning the first arm 4 and the second arm 5, a third arm driving mechanism 12 which drives the third arm 6 to rotate, a hand driving mechanism 13 which drives the hand 7 to rotate and a hand driving mechanism 14 winch drives the hand 8 to rotate.

As shown in FIG. 2, the robot 1 is installed in the semiconductor manufacturing system 16 for use. More specifically, the robot 1 is arranged at the entrance of the semiconductor manufacturing system to take out a wafer 2 from a cassette 17 and store the wafer 2 in a processing device 18.

The main body section 3 is formed in a cylindrical shape. A lifting mechanism (no illustration) is stored inside the main body section 3 to elevate the first arm 4. The first arm 4, the second arm 5 and the third arm 6 are formed hollow. The base and of the first arm 4 is turnably joined to the main body section 3. The base end of the second arm 5 is turnably joined to the front end of the second arm 5. The base end of the third arm 6 is rotatably joined to the front end of the second arm 5. In this embodiment, the main body section 3, the first arm 4, the second arm 5 and the third arm 6 are arranged in this order from the bottom to the top in the top-bottom direction.

The hand 7 is, as shown in FIG. 2, formed such that the shape thereof is a Y-shape when viewed from the top-bottom direction, and the wafer 2 is placed in the forked front end of the hand 7. The hand 8 is formed in the same shape as the hand 7, and the wafer 2 is placed in the forked front end of the hand 8. The base ends of the hand 7 and 8 are rotatably joined to the front end of the third arm 6. The hands 7 and 8 are arranged to line up in the top-bottom direction. Also, the hands 7 and 8 are arranged above the third arm 6.

Note that, in FIG. 2, the illustration of the hand 8 is omitted. During the operation of the robot 1 of this embodiment, the hand 7 and the hand 8 may sometimes line up in the top-bottom direction, but most of the time, the hand 7 and the hand 8 do not line up with each other. For example, as shown by chain double dashed lines, when the hand 7 is placed inside the cassette 17, the hand 8 has been rotated toward the main body section 3 and is not inside the cassette 17. The rotating angle of the hand 8 with respect to the hand 7 at that time is between 120 degrees and 150 degrees, for example.

The arm section driving mechanism 11 is provided with a first drive motor 20 which is a drive source, a first reduction gear 21 for reducing and transmitting the power of the first drive motor 20 to the first arm 4, a second reduction gear 22 for reducing and transmitting the power of the first drive motor 20 to the second arm 5 and a pulley and a belt (not illustrated) connecting the first reduction gear 21 and the second reduction gear 22. The first reduction gear 21 is a harmonic drive (registered trade mark) which is a harmonic drive gearing, for example, and configures a first joint section which joins the main body section 3 and the first arm 4. The second reduction gear 22 is a harmonic drive (registered trade mark), for example, and configures a second joint section which joins the first arm 4 and the second arm 5.

The third arm driving mechanism 12 is provided with a second drive motor 24 which is a drive source and a third reduction gear 25 which reduces and transmits the power of the second drive motor 24 to the third arm 6. The detailed configuration of the third arm driving mechanism 12 is described later.

The hand driving mechanism 13 is provided with a hand drive motor 27 which is a drive source, a hand reduction gear (not illustrated) for reducing and transmitting the power of the hand drive motor 27 to the hand 7 and a pulley and a belt (not illustrated) that connect the hand 7 and the hand reduction gear. In the same manner as the hand driving mechanism 13, the hand driving mechanism 14 is provided with a hand drive motor 28 which is a drive source, a hand reduction gear (not illustrated) for reducing and transmitting the power of the hand drive motor 28 to the hand 8 and a pulley and a belt (not illustrated) that connect the hand 8 and the hand reduction gear. The hand reduction gear is a harmonic drive (registered trade mark), for example.

In the robot 1 configured as above, when the first drive motor 20 is driven, the arm section 9 stretches such that the center of the third reduction gear 25 moves on the straight line L, as shown in FIG. 2. Also, when the second drive motor 24 is driven, the third arm 6 makes a relative rotation with respect to the arm section 9 having the third reduction gear 25 as the center. Further, when the hand drive motor 27 is driven, the hand 7 makes a relative rotation with respect to the third arm 6; when the hand drive motor 28 is driven, the hand 8 makes a relative rotation with respect to the third arm 6.

By combining the above motions, the robot 1 takes out the wafer 2 from the cassette 17 and stores the wafer 2 into the processing device 18. Note that when the robot 1 transports the wafer 2, the arm section 9, the third arm 6 and the hands 7 and 8 are raised or lowered as needed by the lifting mechanism arranged inside the main body section 3.

Figure 3:
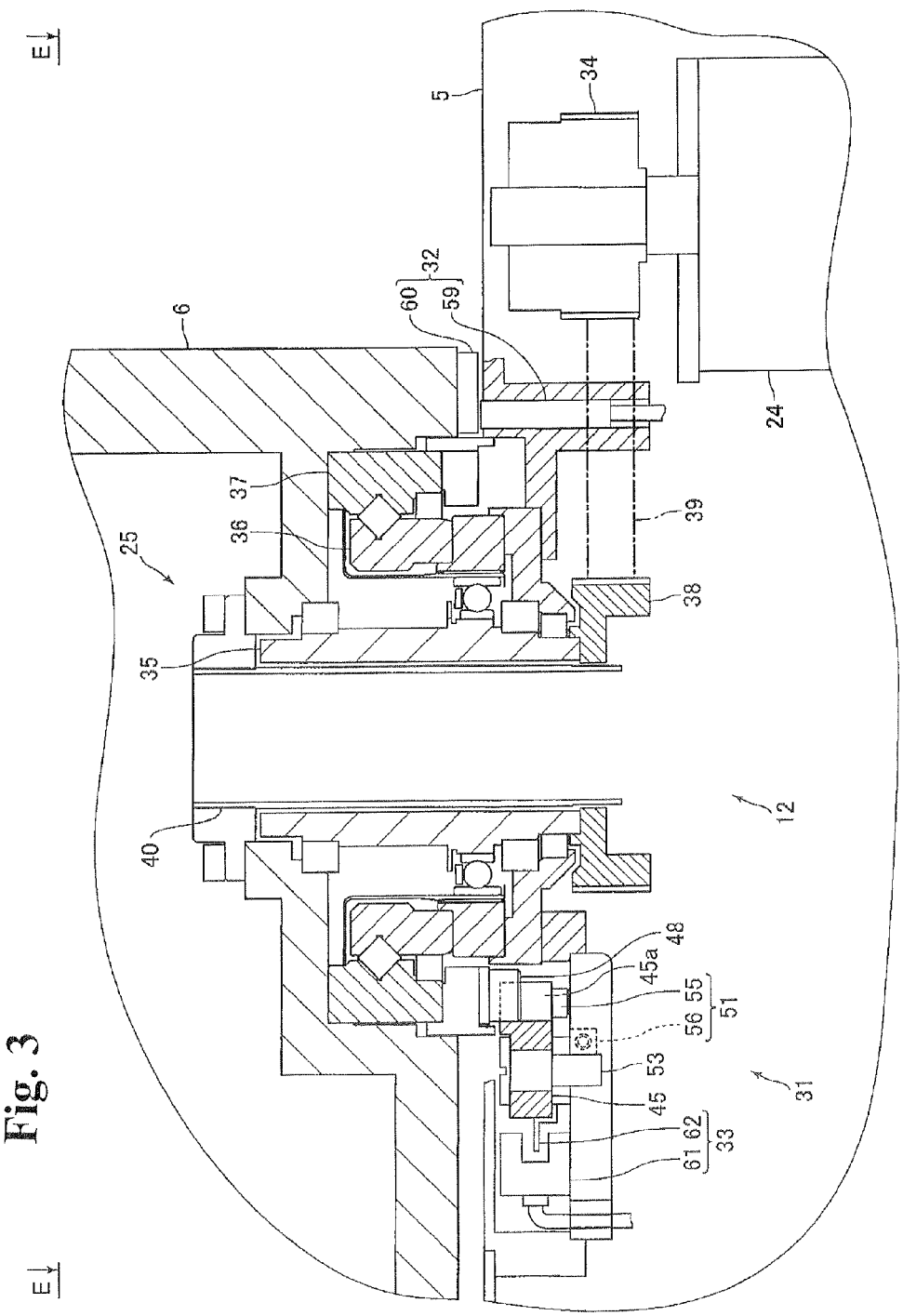
FIG. 3 shows a cross-sectional view of the configuration of a third arm driving mechanism shown in FIG. 1.
Figure 4:
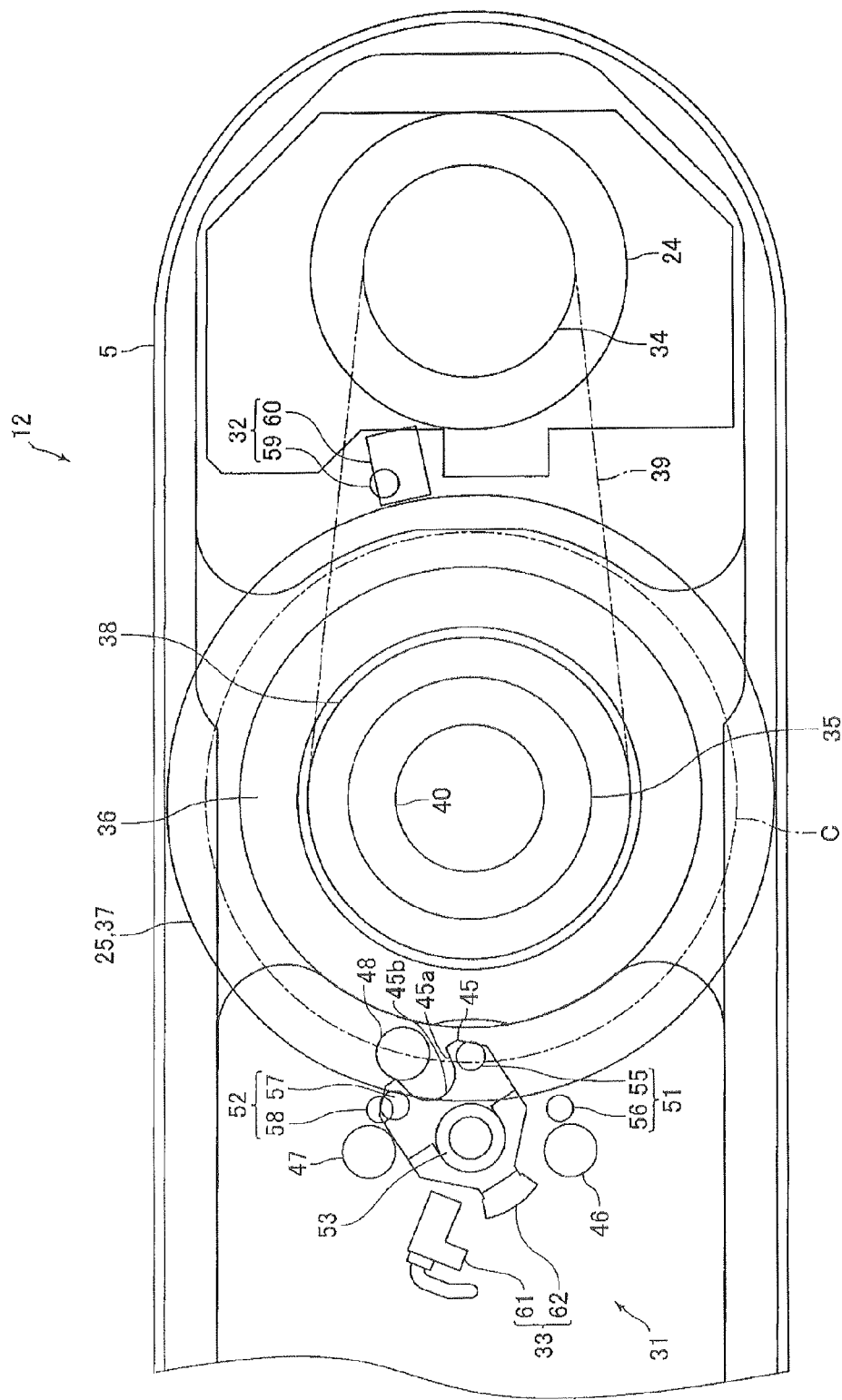
FIG. 4 shows a schematic diagram of the configuration of the third arm driving mechanism from the view point of the E-E direction of FIG. 3.
Figure 5:
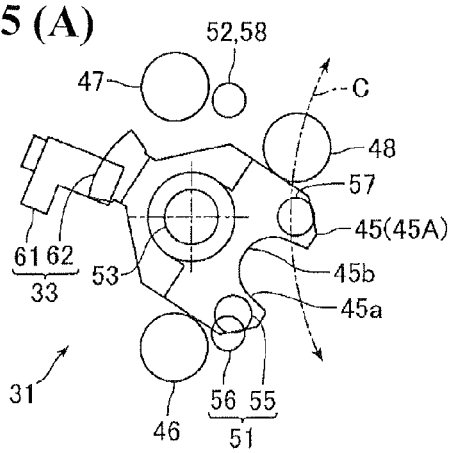
FIG. 5 shows schematic diagrams to explain the operation of a rotating range restricting mechanism shown in FIG. 3.
Figure 5:
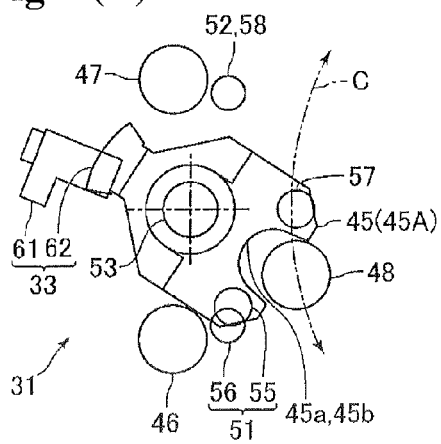
Figure 5:
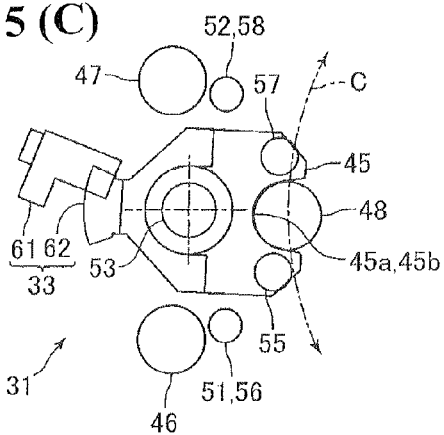
Figure 5:
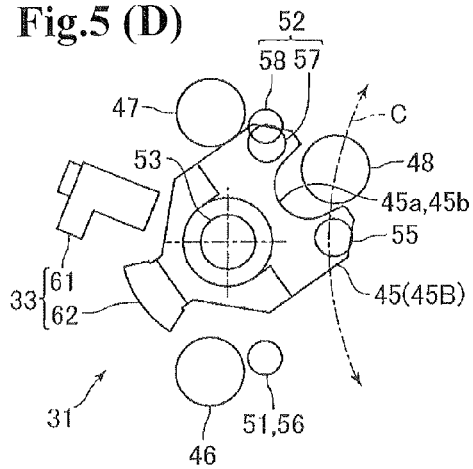
Figure 5:
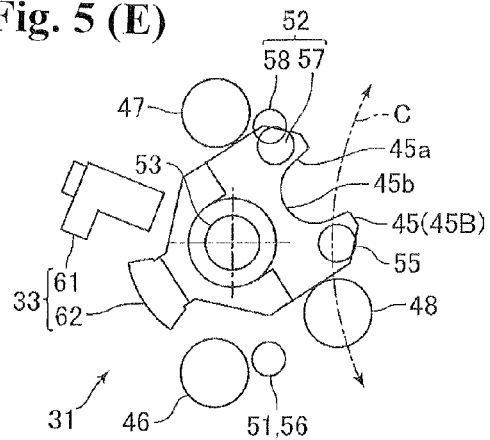
Figure 6:
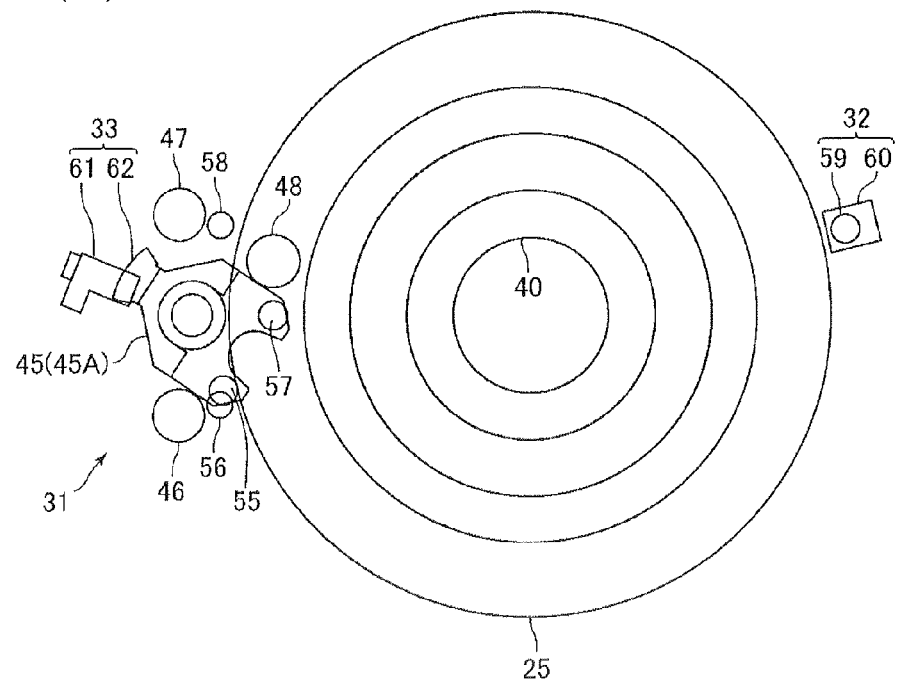
FIG. 6 shows schematic drawings to explain the status of the third arm when the magnetic member is detected by the proximity sensor shown in FIG. 3.
Figure 6:
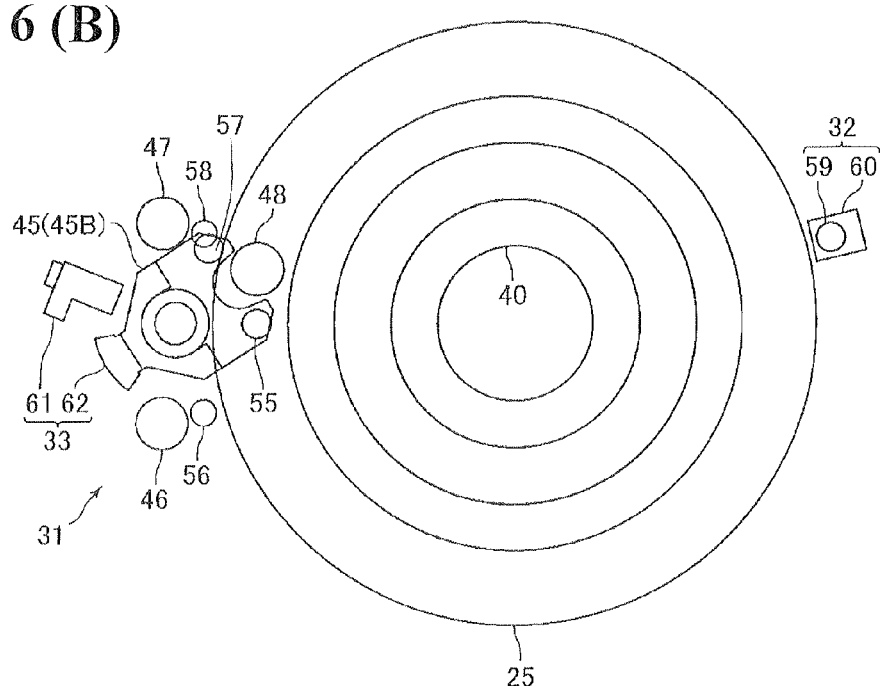

Configuration of Third Arm Driving Mechanism:

FIG. 3 is a cross-sectional view of the configuration of the third arm driving mechanism 12 shown in FIG. 1. FIG. 4 is a schematic diagram of the configuration of the third arm driving mechanism 12 from the viewpoint of the E-E direction of FIG. 3. FIG. 5 show schematic diagrams to explain the operation of the rotating range restricting mechanism 31 shown in FIG. 3. FIG. 6 is schematic diagrams to explain the status of the third arm when the magnetic member is detected by the proximity sensor shown in FIG. 3.

The third arm driving mechanism 12 is, in addition to the above-described second drive motor 24 and the third reduction gear 25, also provided with a rotating range restricting mechanism 31 for restricting the rotating range of the third arm 6 with respect to the second arm 2 and a first detecting mechanism 32 and a second detecting mechanism 33 used to return the third arm 6 to its original position.

The second drive motor 24 is a servomotor. The second drive motor 24 is attached to the front end of the second arm 5. More specifically, the second drive motor 24 is affixed to more toward the front side than the position at which the third reduction gear 25 is arranged. A pulley 34 is affixed to the output shaft of the second drive motor 24.

The third reduction gear 25 configures a third joint section that joins the second arm 5 and the third arm 6. The third reduction gear 25 is a harmonic drive (registered trade mark) and is provided with a wave generator 35, a circular spline 36 and flexspline 37 as shown in FIG. 3. The flexspline 37 is affixed to the third arm 6. The circular spline 36 is affixed to the front end of the second arm 5. On the bottom end of the wave generator 35 a pulley 38 is affixed. Over the pulley 38 and the pulley 34 affixed to the output shaft of the motor 34 a belt 39 is bridged. In this way, the wave generator 35 configures the input shaft of the third reduction gear 25 and the flexpline 37 configures the output shaft of the third reduction gear 25.

A hollow shaft 40 which is arranged to pass through the center of the third reduction gear 25 is affixed to the front end of the second arm 5 having its top-bottom direction as the axial direction. The wave generator 35 is rotatably arranged at the outside circumference of the hollow shaft 40. In this embodiment, a predetermined wiring is pulled through the inner circumference of the hollow shaft 40.

The rotating range restricting mechanism 31 is provided with a swing member (a swing piece) 45 swingably attached to the second arm 5, a stopper 46 as a first restricting member that abuts on the swing member 45 to restrict the swinging range of one end of the swing member 45, a stopper 47 as a second restricting member that abuts on the swing member to restrict the swinging range of the other end of the swing member 45 and an engaging pin 48 as an engaging member that engages with the swing member 45 to let the swing member 45 swing. In this embodiment, the third arm 6 is rotatable 360 degrees or more with respect to the second arm 5, and the rotating range restricting mechanism 31 restricts the rotating range of the third arm 6 which is rotatable 360 degrees or more. Note that the third arm 6 of this embodiment is rotatable about 700 degrees.

Also, the rotating range restricting mechanism 31 is provided with a first magnetic holding mechanism 51 which holds the swing member 45 with magnetic attraction force in the first restricting position 45A (see FIG. 5(A)) at which the swing member 45 abuts on the stopper 46 and a second magnetic holding mechanism 52 which holds the swing member 45 with the magnetic attraction force in the second restricting position 45B (see FIG. 5(E)) at which the swing member 45 abuts on the stopper 47.

The engaging pin 48 is formed in a cylindrical shape. The engaging pin 48 is affixed on the bottom face of the flexpline 37 via the predetermined members. In other words, the engaging pin 48 is affixed to the third arm 6 via the flexpline 37, etc. The engaging pin 48 engages with an engaging recess 45a which is formed in the swing member 45 and described later, to allow be swing member 45 to swing between the first restricting position 45A and the second restricting position 45B.

The swing member 45 is formed of a non-magnetic material in a block shape. The swing member 45 is swingably supported by the supporting shaft 53 affixed to the second arm 5 and is capable of swinging by pivoting about the supporting shaft 53. The supporting shaft 53 is affixed to the second arm 5 having the top-bottom direction as the axial direction. Also, the supporting shaft 53 is affixed to the second arm 5 on the outer side of the third reduction gear 25 in the diameter direction, in other words, as shown in FIG. 4, when viewed from the top-bottom direction, the center of the swinging of the swing member 45 is located outside the imaginary circle C which is the trace of the center of the engaging pin 48 rotating with the third arm 6. Also, the supporting shaft 53 is arranged more toward the base end of the second arm 5 than the third reduction gear 25.

In the swing member 45 the engaging recess 45a is formed to engage with the engaging pin 48 when the swing member 45 swings between the first restricting position 45A and the second restricting position 45B. The engaging recess 45a is formed such that the shape thereof viewed from the top-bottom direction is in a U-shape, and the side face of the engaging recess 45a has a semi-arc concave surface 45b thereon. The inside diameter of the concave surface 45b is equal to the outside diameter of the engaging pin 48. Note that since the engaging recess 45a is formed having a U-shape when viewed in the top-bottom direction, the swing member 45 of this embodiment is formed having a U-shape when viewed in the top-bottom direction.

The stopper 46, 47 is formed in a cylindrical shape. The stopper 46 is affixed to the second arm 5 such that it abuts on one side face of the swing member 45 in the swinging direction of the swing member 45, and the stopper 47 is affixed to the second arm 5 such that it abuts on the other side face of the swing member 45 in the swinging direction of the swing member 45. Also, the stopper 46 and 47 are affixed to the second arm 5 such that the swinging angle of the swing member 45 is between about 20 degrees and 30 degrees, for example.

The engaging pin 48, as shown in FIG. 5(A), is capable of abutting on the other side face of the swing member 45 positioned in the first restricting position 45A to press the one side face of the swing member 45 against the stopper 46; when the engaging pin 48 abuts on the other side face of the swing member 45 positioned in the first restricting position 45A, to press the one side face of the swing member 45 against the stopper 46, the rotating range of one end of the third arm 6 to which the engaging pin 48 is affixed via the flexpline 37, etc, is restricted. Also, as shown in FIG. 5(E), the engaging pin 48 is capable of abutting on the one side face of the swing member 45 positioned in the second restricting position 45B to press the other side face of the swing member 45 against the stopper 47; when the engaging pin 48 abuts on the one side face of the swing member 45 positioned in the second restricting position 45B to press the other side face of the swing member 45 against the stopper 47, the rotating range of the other end of the third arm 6 is restricted.

When the third arm 6 is rotated clockwise in FIG. 5 from the position shown in FIG. 5(A) and the engaging pin 48 rotates about 330 degrees with respect to the center of the third reduction gear 25, the engaging pin 48 abuts on the side face of the engaging recess 45a as shown in FIG. 5(B), and then engages with the engaging recess 45a as shown in FIG. 5(C). As the engaging pin 48 abuts on the side face of the engaging recess 45a and engages with the engaging recess 45a, the swing member 45 turns from the first restricting position to the second restricting position 45B following the rotation of the third arm 6, as shown in FIG. 5(B) through (D). Also, in the process in which the swing member 45 turns from the first restricting pout on 45A to the second restricting position 45B, the engaging pin 48 comes off the engaging recess 45a as shown in FIG. 5(D). Further, with the further clockwise rotation of the third arm 6 by 330 degrees, for example, the engaging pin 48 abuts on the one side face of the swing member 45 to restrict the clockwise rotation of the third arm 6 as shown in FIG. 5(E).

In the same manner, when the third arm 6 is rotated counterclockwise in FIG. 5 from the state of the mechanism shown in FIG. 5(E) and the engaging pin 48 rotates about 330 degrees pivoting about the center of the third reduction gear 25, the engaging pin 48 abuts on the side face of the engaging recess 45a and then engages with the engaging recess 45a as shown in FIG. 5(C). As the engaging pin 48 abuts on the side face of the engaging recess 45a and engages with the engaging recess 45a, the swing member 45 turns from the second restricting position 45B to the first restricting position 45A following the rotation of the third arm 6, as shown in FIG. 5(D) through (B). Also, in the process in which the swing member 45 turns from the second restricting position 45B to the first restricting position 45A, the engaging pin 48 comes off the engaging recess 45a as shown in FIG. 5(B). Further, with the further counterclockwise rotation of the third arm 6 by about 330 degrees in FIG. 5, the engaging pin 48 abuts on the other side face of the swing member 45 to restrict the counterclockwise rotation of the third arm 6, as shown in FIG. 5(A).

As described above, in this embodiment, when the third arm 6 is rotated clockwise in FIG. 5, if the swing member 45 is in the first restricting position 45A, even when the engaging pin 48 reaches the arrangement location of the swing member 45 (the position at which the swing member 45 is swingably attached), the engaging pin 48 can pass the arrangement location of the swing member 45 while turning the swing member 45 toward the second restricting position 45B; therefore, the third arm 6 can be further rotated. On the other hand, when the third arm 6 is rotated clockwise in FIG. 5, if the swing member 45 is in the second restricting position 45B, as the engaging pin 48 reaches the arrangement location of the swing member 45, the engaging pin 48 abuts on the swing member 45 which has already abutted on the stopper 47, and consequently the third arm 6 can rotate no more.

When the third arm is rotated counterclockwise in FIG. 5, if the swing member 45 is in the second restricting position 45B, even when the engaging pin 48 reaches the arrangement location of the swing member 45, the engaging pin 48 can pass the arrangement position of the swing member 45 while turning the swing member 45 toward the first restricting position 45A; therefore, the third arm 6 can further rotate. On the other hand, when the third arm 6 is rotated counterclockwise in FIG. 5, if the swing member 45 is in the second restricting position 45A, as the engaging pin 48 reaches the arrangement location of the swing member 45, the engaging pin 48 abuts on the swing member 45 that has already abutted on the stopper 47, and consequently the third arm 6 can rotate no more.

Note that, in this embodiment, when the swing member 45 is positioned between the first restricting position 45A and the second restricting position 458, the swing member 45 and the engaging pin 48 are engaged with each other as shown in FIG. 5(C) such that the outer circumferential face of the engaging pin 48 makes contact with a relatively wide area of the concave surface 45b, and the center of curvature of the concave surface 45b coincides with the center of the engaging pin 48 when viewed in the top-bottom direction. Also, in this embodiment, the second arm 5 is a supporting body that supports the third arm 6 rotatable 360 degrees or more, and the third arm 6 is a rotating body which is rotatable 360 degrees or more.

The first magnetic holding mechanism 51 is configured by a magnetic member 55 affixed to the swing member 45 and a permanent magnet 56 affixed to the second arm 5. The second magnetic holding mechanism 52 is, in the same manner as the first magnetic holding mechanism 51, configured by a magnetic member 57 affixed to the swing member 45 and a permanent magnet 58 affixed to the second arm 5.

The magnetic members 55 and 57 are formed in a cylindrical shape and affixed to the bottom of the swing member 45. Also, the magnetic members 55 and 57 are affixed to the swing member 45 at the both sides of the engaging recess 45a such that the engaging recess 45a is sandwiched by the magnetic member 55 and the magnetic member 57. The permanent magnets 56 and 58 are formed in a cylindrical shape. The permanent magnet 56 is affixed to the second arm 5 to be adjacent to the stopper 46, and the permanent magnet 58 is affixed to the second arm 5 to be adjacent to the stopper 47. Also, the permanent magnets 56 and 58 are affixed to the second arm 5 such that a gap is created between the bottom face of the magnetic member 55, 57 and the permanent magnet 56, 58 in the top-bottom direction.

As shown in FIG. 5(A) and), when the swing member 45 is in the first restricting position 45A, part of the magnetic member 55 overlaps with part of the permanent magnet 56 when viewed in the top-bottom direction, and the swing member 45 is held in the first restricting position 45A by the magnetic attraction force generated between the magnetic member 55 and the permanent magnet 56. Note that the center of the magnetic member 55 is shifted from the center of the permanent magnet 56 when viewed in the top-bottom direction so that the magnetic attraction is produced to press one side face of the swing member 45 against the stopper 46 when the swing member 45 is in the first restricting position 45A.

As shown in FIGS. 5(D) and (E), when the swing member 45 is in the second restricting position 45B, part of the magnetic member 57 is overlapped with part of the permanent magnet 58 when viewed in the top-bottom direction, and the swing member 45 is held in the second restricting position 45B by the magnetic attraction produced between the magnetic member 57 and the permanent magnet 58. Note that the center of the magnetic member 57 is shifted from the center of from the permanent magnet 58 when viewed in the top-bottom direction so that the magnetic attraction is produced to press the other side face of the swing member 45 against the stopper 47 when the swing member 45 is in the second restricting position 45B.

The first detecting mechanism 32 is provided with a proximity sensor 59 affixed to the second arm 5 and a magnetic member 60 affixed to the third arm 6. The proximity sensor 59 is affixed to the second arm 5 such that the third reduction gear 25 is sandwiched between the swing member 45 and the proximity sensor 59. In other words, the proximity sensor 59 is affixed more toward the front end of the second arm 5 than the third reduction gear 25. Also, the proximity sensor 59 is affixed to the second arm 5 such that the detecting face thereof faces up. The magnetic member 60 is formed in a plate shape and affixed to the third arm 6 to run above the detecting face of the proximity sensor 59. The third arm 60 of this embodiment is formed of a non-magnetic material such as aluminum; when the proximity sensor 59 detects the magnetic member 60, that the third arm 6 is in a predetermined position with respect to the second arm 5 is detected.

The second detecting mechanism is also provided with an optical sensor 61 in which a light emitting device and a light sensing device are arranged opposite from each other and a light shielding member 62 affixed to the swing member 45. The optical sensor 61 is affixed to the second arm 5. The light-shielding member 62 is affixed to the swing member 45 such that it can interrupt the light emitted from the light emitting device to the light sensing device of the optical sensor 61. In this embodiment, as shown in FIG. 5(A), when the swing member 45 is in the first restricting position 45A, the light-shielding member 62 interrupts the light emitted from the light emitting device to the light sensing device of the optical sensor 61; as shown in FIG. 5(B), when the swing member 45 is in the second restricting position 45B, the light-shielding member 62 is off the optical path between the light emitting device and light sensing device of the optical sensor 61.

As described above, the third arm 6 is capable of rotating 360 degrees or more with respect to the second arm 5. For this reason, the status of the third arm 6 with respect to the second arm 5 when the magnetic member 60 is detected by the proximity sensor 59 can be the status as shown in FIG. 6(A), in which only the clockwise rotation of the third arm 6 is allowed, and the status as shown in FIG. 6(B), in which the rotation of the third arm 6 is allowed in the both directions. In other words, in this embodiment, the first detecting mechanism 32 alone is not sufficient to accurately detect the status or position of the third arm 6 with respect to the second arm 5. Therefore, in this embodiment, when the control section controlling the second drive motor 24 loses the relative rotating angle of the third arm 6 with respect to the second arm 5, the function of the first detecting mechanism 32 alone is not sufficient to return the third arm 6 to its original position.

In this embodiment, then, the functions of the first detecting mechanism 32 and the second detecting mechanism 33 are used to return the third arm 6 to its original position. More specifically, the first detecting mechanism 32 and the second detecting mechanism 33 are arranged such that the magnetic member 60 is detected by the proximity sensor 59 and the light-shielding member 62 interrupts the optical path between the light-emitting device and the light-sensing device of the optical sensor 61 when the third arm 6 is in the original position, as shown in FIG. 6(A); by using the first detecting mechanism 32 and the second detecting mechanism 33, the third arm 6 is returned to its original position. Alternatively, the first detecting mechanism 32 and the second detecting mechanism 33 are arranged such that the magnetic member 60 is detected by the proximity sensor 59 and the light-shielding member 62 comes off the optical path between the light-emitting device and the light-sensing device of the optical sensor 61 when the third arm 6 is in the original position; by using the first detecting mechanism 32 and the second detecting mechanism 33, the third arm 6 is returned to its original position.

Major Effects of this Embodiment:

As described above, in this embodiment, the swing member 45 is held in the first restricting position 45A by the magnetic attraction force generated by the first magnetic holding mechanism 51 and held in the second restricting position 45B by the magnetic attraction force generated by the second magnetic holding mechanism 52. Therefore, even when the swing member 45 needs to be held in the first restricting position 45A or in the second restricting position 45B to properly rotate the third arm 6 at 360 degrees or more with respect to the second arm 5, there is no need to have the member for holding the swing member 45 in the first restricting position 45A or in the second restricting position 45B make contact with the swing member 45. For this reason, in this embodiment, dust or noise can be suppressed from being generated accompanying the swing of the swing member 45 swinging between the first restricting position 45a and the second restricting position 45B.

In this embodiment, the center of the swing of the swing member 45 is located outside the imaginary circle C which is a trace of the center of the engaging pin 48 when viewed in the top-bottom direction. Therefore, compared to the case in which the center of the swing of the swing member 45 is located inside the imaginary circle C, even if the distance from the center of the third reduction gear 25 to the engaging pin 48 is shortened, the engaging pin 48 which rotates together with of the third arm 6 can be engaged with the engaging groove 45a properly; and the engaging pin 48 which is in engagement with the engaging groove 45a can properly be disengaged from the engaging groove 45a. In other words, in this embodiment, even if the distance from the center of the third reduction gear 25 to the engaging pin 48 is shortened, the swing member 45 can still be swung properly. Therefore, in this embodiment, the rotation radius of the engaging pin 48 can be minimized, resulting in minimizing the size of the rotating range restricting mechanism 31 and minimizing the size of the third joint section that joins the second arm 5 and the third arm 6 together.

In this embodiment, the semi-arc concave surface 45b is formed on the side face of the engaging groove 45a, and the inside diameter of the concave surface 45b is equal to the outside diameter of the engaging pin 48. Also, in this embodiment, the swing member 45 and the engaging pin 48 are engaged with each other such that the outer circumferential surface of the engaging pin 48 makes contact with a relatively wide range of the concave surface 45b. For this reason, even if the second drive motor 24 is halted when the swing member 45 is somewhere between the first restricting position 45A and the second restricting position 45B, the engaging pin 48 engaging with the engaging groove 45a can prevent the swing member 45 from being wobbly. In other words, if the second drive motor 24 is halted when the swing member 45 is somewhere between the first restricting position 45A and the second restricting position 45B, the force of the first magnetic holding mechanism 51 for holding the swing member 45 and the force of the second magnetic holding mechanism 52 for holding the swing member 45 do not work; therefore, the swing member 45 may be wobbly despite the fact that the second drive motor 24 has stopped and the engaging pin 48 has also stopped. However, in this embodiment, this engaging pin 48 can prevent the wing member 45 from being wobbly.

Other Embodiments:

The embodiment described above is an example of the preferred embodiments of the present invention, but it is not limited to this and can be varyingly modified within the scope of the present invention.

In the above-described embodiment, the magnetic member 55 is affixed to the swing member 45 while the permanent magnet 56 is affixed to the second arm 5; however, the magnetic member 55 may be affixed to the second arm 5 and the permanent magnet 56 may be affixed to the swing member 45 instead. In the same manner, in the above-described embodiment, the magnetic member 57 is affixed to the swing member 45 while the permanent magnet 58 is affixed to the second arm 5; however, the magnetic member 57 may be affixed to the second arm 5 and the permanent magnet 58 may be affixed to the swing member 45 instead. Also, as long as the swing member 57 is formed of a magnetic material, the magnetic members 57 and 57 do not have to be affixed to the swing member 45. Note that, compared to the case in which the swing member 45 is formed of a magnetic material, the magnetic attraction force of the first magnetic holding mechanism 51 and the second magnetic holding mechanism 52 can be increased more easily when the magnetic member 55 and 57 are affixed to the swing member 45 which is formed of a non-magnetic material instead.

Also, the first magnetic holding mechanism 51 and the second magnetic holding mechanism 52 may respectively be provided with a permanent magnet which is affixed to the swing member 45 in place of the magnetic member 55, 57. In this case, for example, the permanent magnet to be affixed to the swing member 45 is magnetized and arranged such that the swing member 45 is held between the first restricting position 45A or in the second restricting position 45B by the magnetic attraction force generated between the permanent magnet that is to be affixed to the swing member 45 and the permanent magnet 56, 58. Alternatively, the permanent magnet to be affixed the swing member 45 is magnetized and arranged such that the swing member 45 is held between the first restricting position 45A or in the second restricting position 45B by the magnetic repelling force generated between the permanent magnet that is to be affixed to the swing member 45 and the permanent magnet 56, 58.

In the above-described embodiment, the center of the swing of the swing member 45 when viewed in the top-bottom direction is located outside the imaginary circle C which is a trace of the center of the engaging pin 48. Alternatively, the center of the swing of the swing member 45 when viewed in the top-bottom direction may be located inside the imaginary circle C. In this case, the swing member 45, etc, would be arranged below the third reduction gear 25, for example. Also, in the above-described embodiment, the swing member 45 is formed having an U-shape when viewed in the top-bottom direction; however, the swing member may be formed having an L-shape when viewed in the top-bottom direction.

In the above-described embodiment, the third reduction gear 25 is a harmonic drive (registered trade mark); however, the third reduction gear 25 may be a gear having a hollow construction other than the harmonic drive (registered trade mark). For example, the third reduction gear 25 may be a cycloidal reduction gear (registered trade mark), an RV (Rotor Vector) reduction gear or an epicycle reduction gear. Also, the third reduction gear 25 may be a reduction gear provided with a first hypoid gear and a second hypoid gear that meshes with the first hypoid gear. Also, the third reduction gear 25 may have a hollow construction.

In the above-described embodiment, the rotating range restricting mechanism 31 restricts the rotating range of the third arm 6 with respect to the second arm 5. Besides this, when the first arm 4 rotates 360 degrees or more with respect to the main body section 3, the rotating range restricting mechanism 31 may be used to restrict the rotating range of the first arm 4 with respect to the main body section 3. Also, when the second arm 5 rotates 360 degrees or more with respect to the first arm 4, the rotating range restricting mechanism 31 may be used to restrict the rotating range of the second arm 5 with respect to the first arm 4. Also, when the hands 7, 8 rotate 360 degrees or more with respect to the third arm 6, the rotating range restricting mechanism 31 may be used to restrict the rotating range of the hands 7, 8 with respect to the third arm 6.

In the above-described embodiment, the robot 1 is a robot for transporting semi-conductor wafers 2; however, the robot 1 may be a transporting robot that transport other objects-to-be-transported such as liquid crystal (LC) glass substrates, or an industrial robot such as an assembling robot, other than the transporting robot. In other words, the rotating range restricting mechanism 31 may be adopted in robots other than the robot 1. Also, the rotating range restricting mechanism 31 may be adopted in various devices having a rotating body which is rotatable 360 degrees or more with respect to a supporting body other than the robot.

REFERENCE NUMERALS:

1 Robot (Industrial robot)
3 Main body section
4 First arm
5 Second arm (Supporting body)
6 Third arm (Rotating body)
7, 8 Hand
31 Rotating range restricting mechanism (Rotating range restricting mechanism for rotating body)
45 Swing member
45*a* Engaging groove
45*b* Concave surface
45A First restricting position
45B Second restricting position
46 Stopper (First restricting member)
47 Stopper (Second restricting member)
48 Engaging pin (Engaging member)
51 First magnetic holding mechanism
52 Second magnetic holding mechanism
55, 57 Magnetic member
56, 58 Permanent magnet
C imaginary circle

What is claimed is:

1. A rotating range restricting mechanism for a rotating body that restricts a rotating range of a rotating body which is rotatable 360 degrees or more with respect to a supporting body, comprising:
a swing member which is rotatably attached to said supporting body;
a first restricting member which is affixed or formed to said supporting body and abuts on said swing member when said swing member is rotated to one end of a swing range of said swing member to restrict the swing range;
a first restricting member which is affixed or formed to said supporting body, and which restricts one end of a swing range of said swing member by abutting on said swing member when said swing member is rotated to the one end of a swing range of said swing member;
a second restricting member which is affixed or formed to said supporting body, and which restricts the other end of the swing range of said swing member by abutting on said swing member when said swing member is rotated to the other end of the swing range of said swing member;
an engaging member which is affixed or formed to said rotating body and engages with said swing member to allow said swing member to swing between a first restricting position, at which said swing member abuts on said first restricting member, and a second restricting position, at which said swing member abuts on said second restricting member;
a first magnetic holding mechanism which holds said swing member in said first restricting position with a magnetic attraction force or magnetic repelling force; and
a second magnetic holding mechanism which holds said swing member in said second restricting position with the magnetic attraction force or magnetic repelling force;
wherein said first magnetic holding mechanism and said second magnetic holding mechanism are each provided with a permanent magnet fixed to said swing member and a magnetic member or a permanent magnet fixed to said supporting body.

2. The rotating range restricting mechanism for a rotating body as set forth in claim 1;
wherein a center of the swing range of said swing member when viewed in an axial direction of a rotating axis of said rotating body is located outside an imaginary circle which is a trace of said engaging member rotating together with said rotating body.

3. The rotating range restricting mechanism for a rotating body as set forth in claim 2;
wherein an engaging groove is formed on said swing member;
wherein said engaging member engages with the engaging groove to allow said swing member to swing between said first restricting position and said second restricting position;
wherein said engaging member is formed in a cylindrical shape; and
wherein a semi-arc concave surface, having an inside diameter equal to an outside diameter of said engaging member, is formed on the side face of said engaging groove.

4. An industrial robot comprising:
the rotating range restricting mechanism for a rotating body as set forth in claim 1;
a main body section;
a first arm having a base end which is turnably joined to said main body section;
a second arm having a base end which is turnably joined to a front end of said first arm;
a third arm having a based end which is rotatably joined to a front end of said second arm; and
hands with a base end which is rotatably joined to a front end of said third arm;
wherein said rotating body is said third arm, and said supporting body is said second arm.

* * * * *